United States Patent [19]
Jossic

[11] 3,846,684
[45] Nov. 5, 1974

[54] FEEDING DEVICE FOR DIRECT CURRENT MOTOR

[75] Inventor: Alain Francois Jossic, Belfort, France

[73] Assignee: Societe Honeywell Bull (Societe Anonyme), Paris, France

[22] Filed: Apr. 2, 1973

[21] Appl. No.: 347,286

[30] Foreign Application Priority Data
Apr. 10, 1972 France .............................. 72.12431

[52] U.S. Cl. .............................................. 318/257
[51] Int. Cl. ............................................ H02p 5/16
[58] Field of Search ............ 318/257, 255, 256, 345

[56] References Cited
UNITED STATES PATENTS
3,293,522   12/1966   Lewis............................. 318/257 X
3,480,849   11/1969   Thornsen et al..................... 318/257
3,504,258   3/1970    Stern et al. ......................... 318/257

Primary Examiner—Robert K. Schaefer
Assistant Examiner—W. E. Duncanson, Jr.
Attorney, Agent, or Firm—Fred Jacob

[57] ABSTRACT

A feeding device for a direct current motor, comprising on the one hand, at least two current flow control arrangements placed on either side of the said motor to form a branch of a circuit connected to the terminals of a direct current power supply, each of said arrangements including at least one power transistor and, on the other hand, an actuating device itself controlled by a control signal to render the two said arrangements simultaneously on or off.

According to the invention, the device is characterized in that said actuating device comprises means for rendering one of the said arrangements completely "on" by saturating its power transistors, whatever the amplitude of the control signal and for rendering the other of the said arrangements partly "on" by controlling the conduction of its power transistors according to the amplitude of said control signal.

10 Claims, 1 Drawing Figure

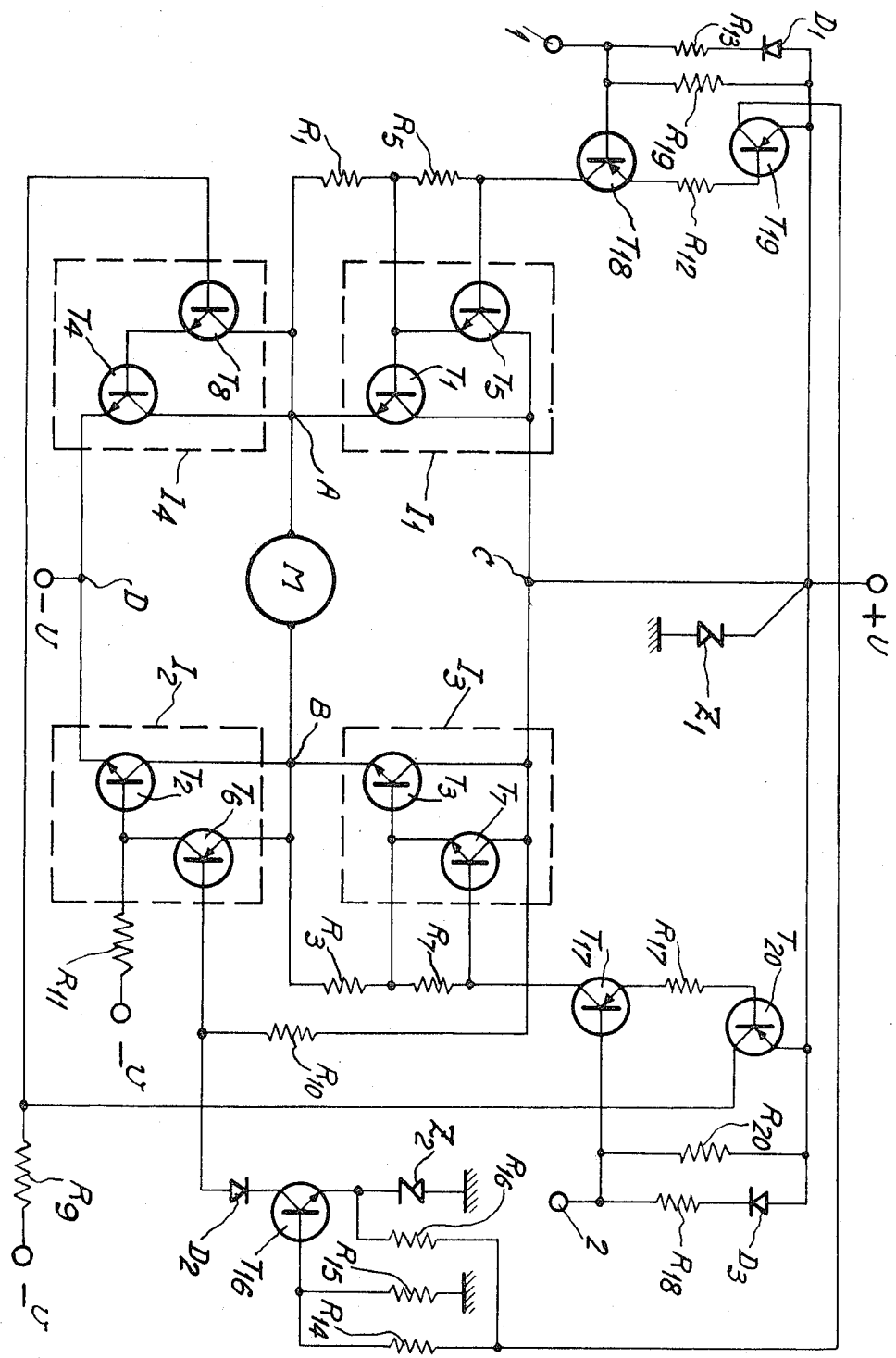

FEEDING DEVICE FOR DIRECT CURRENT MOTOR

BACKGROUND OF THE INVENTION

The present invention relates to a device for feeding a motor with D. C. current.

Various devices for feeding a motor with D. C. current are already known. They generally comprise four arrangements for the control of the passage of an electric current mounted in a bridge. Said motor is installed in one of the diagonals of said bridge whose other diagonal is connected with the terminals of a source of D. C. power. Thus, when the two arrangements opposite the bridge are made conductive, a current circulates in the motor. The direction of this current reverses itself when it passes from one pair of opposed fixtures to the other. One of these arrangement pairs may be associated with imparting speed, and the other with braking or reversal of the revolving direction, of the motor.

In the known devices it is common that such arrangements are made with power transistors. Such transistors are bound to offer good performances and a substantial breakdown voltage. They are, however, costly.

The present invention is concerned with a feeding device of the above mentioned type in which some of these expensive transistors may be replaced by transistors of more modest performances, hence of a lower cost.

SUMMARY OF THE INVENTION

According to the invention the device for feeding a motor with D. C. current includes, on one hand, at least two arrangements for control of the passage of an electric current installed on either side of the motor to form a branch of the circuit, connected with the terminals of a source of D. C. power, each of said arrangements comprising at least one power transistor and, on the other hand, an actuating device itself controlled by a control signal, to simultaneously render said arrangements conductive or blocking. This device then is noteworthy in that said driving device comprises means to render one of said arrangements fully conductive by saturating its power transistors, irrespective of the amplitude of the control signal, and to render the other of said arrangements partially conductive by controlling the conduction of its power transistors as a function of the amplitude of said control signal. Thus, as the transistors of the one arrangement are automatically saturated they are subjected to little stresses under working conditions. They may, therefore, be transistors of relatively modest performance. The transistors of the other arrangement, by contrast, control the passage of the current to the motor, hence that imparting speed to it, and are subjected to high stresses. They must be capable of high performance, therefore, identical with those required in known devices. The invention, though, requires such transistors for only one of the arrangements The device according to the invention is, therefore, lower in cost than known devices.

Each arrangement controlling the passage of current may consist, in a known manner, of two power transistors of the same polarity mounted in a Darlington connection.

The driving device preferably includes transistors of which the first, receiving the control signal at its base, controls by its emitter-collector path, on the one hand, the fixture apt to become partially conductive and, on the other hand, the second transistor which is saturated and whose emitter-collector path controls the fixture apt to become entirely conductive. In fact, the signal emitted by the second transistor is more important than the one emitted by the first, and can saturate the power transistors of the corresponding fixture.

In an advantageous mode of embodiment, the feeding device according to the invention comprises, in a known fashion, besides the two first arrangements already mentioned, two second arrangements for control of the passage of electric current each including at least one power transistor and with the first transistors forming a bridge whose one diagonal is linked to the terminals of the power source and the other to the terminals of said motor. Thus, the first arrangements may serve to control the motor in a direct sense, while the second arrangements may serve for braking it, and possibly for reversing its direction of rotation.

According to the invention, the feeding device includes a second driving device, similar to the first and controlled by a braking signal aside from the control signal, This second driving device comprises means for rendering one of said second arrangements entirely conductive by saturating its power transistors, irrespective of the amplitude of the brake signal, and to render the other of said second arrangements partially conductive by controlling the conduction of its power transistors as a function of the amplitude of said brake signal.

Here then, one may use power transistors of a relatively average performance to render the second arrangement entirely conductive. That second arrangement which was rendered partially conductive may also very well consist of a compound connection of two power transistors of the same polarity.

When braking, to avoid excess voltages appearing in the terminals of this second, partially conductive arrangement due to the counter-electromotive force of the motor, it is preferable that when the other of said second arrangements is rendered entirely conductive a certain threshold voltage, determined in advance, exist in the terminals. In this way, this threshold voltage is deducted from the voltage in the terminals of the second, partially conductive arrangement. For that purpose, said second driving device controls the second, partly conductive arrangement by means of a transistor type circuit breaker which when closed imposes a fixed potential at the connection point between this arrangement and the motor.

BRIEF DESCRIPTION OF THE DRAWING

The single illustration of the design will aid in the comprehension of the workings of the invention. This illustration shows an advantageous embodiment of the device, according to the invention.

DESCRIPTION OF THE PREFERRED EMBODIMENT

The device shown by the illustration is intended to feed a motor M with D. C. current, and includes four arrangements $I_1$ to $I_4$ for control of the passage of an electric current set up in a bridge. The motor M is positioned in the diagonal AB of this bridge, while a source of D. C. feeding voltage $+U$, $-U$ is linked with the ends of the other diagonal CD, of said bridge. A Zerer diode $Z_1$ stabilizes the potential of point C connected with the pole $+U$.

In the given example, it is assumed that the normal work performed by the motor M requires the passage of a feed current from B toward A. It is, therefore, absolutely necessary that the arrangements $I_3$ and $I_4$ allow the current to pass while the arrangements $I_1$ and $I_2$ block any current. When one wishes to brake the motor M, or even reverse its direction of rotation, one renders the arrangements $I_1$ and $I_2$ conductive and blocks the conduction of the arrangements $I_3$ and $I_4$. Then a current running from A to B crosses the motor M.

Each arrangement $I_1$ to $I_4$ consists of two transistors $T_1$, $T_5$ - $T_2$, $T_6$ - $T_3$, $T_7$ - $T_4$, $T_8$, respectively. The transistors of the arrangements $I_1$, $I_3$ and $I_4$ are of the NPN type and are mounted in conformance with a Darlington circuit.

The collectors of the transistors $T_1$ and $T_5$ are joined at the point C, while the emitter of $T_5$ is tied to the base of $T_1$, and the emitter of the latter is linked to point A. A resistor $R_5$ is positioned between the bases of the transistors $T_1$ and $T_5$, and another resistor $R_1$ is placed between the base of $T_1$ and point A.

The collectors of the transistors $T_3$ and $T_7$ are joined at point C, while the emitter of $T_7$ is connected with the base of $T_3$ and the emitter of the latter is linked to point B. A resistor $R_7$ is positioned between the bases of $T_3$ and $T_7$, and another resistor $R_3$ is placed between the base of $T_3$ and the point B.

The collectors of the transistors $T_4$ and $T_8$ are joined at point A, while the emitter of $T_8$ is tied to the base of $T_4$, and the emitter of the latter is connected with point D. The base of the transistor $T_8$ is linked to a point of the potential $-V$ by means of a resistor $R_9$.

The arrangement $I_2$ consists of a transistor $T_2$ of the NPN type and of a transistor $T_6$ of the PNP type. The collector of $T_2$ and the emitter of $T_6$ are joined at point B, while the collector of $T_6$ is tied to the base of $T_2$ and the emitter of the latter is linked to point D. A resistor $R_{10}$ connects the base $T_6$ with point C, while the base of $T_2$ is linked to the point of potential $-v$ by a resistor $R_{11}$. Each arrangement $I_1$ to $I_4$ is controlled by means of a low-power transistor. The transistors $T_{18}$, $T_{19}$, $T_{17}$, and $T_{20}$ of the PNP type control the fixtures $I_1$, $I_2$, $I_3$, and $I_4$, respectively.

The collector of the transistor $T_{18}$ is tied to the base of transistor $T_5$. Its base is joined to a terminal 1 to which a signal controlling the braking and/or the reversing of the direction of the motor M are sent, while its emitter is linked to the base of the transistor $T_{19}$ by a resistor $R_{12}$. The emitter of the transistor $T_{19}$ is, on the one hand, linked to the pole $+U$, on the other hand, to the base of the transistor $T_{18}$ by means of a resistor $R_{19}$. A diode $D_1$ and a resistor $R_{13}$ are series connected and are mounted in parallel with the resistor $R_{19}$. The collector of transistor $T_{19}$ is connected with the base of the transistor $T_6$ by a connection comprising a transistor $T_{16}$ of the NPN type. The collector of this transistor is joined with the base of transistor $T_6$ by a diode $D_2$. A Zener diode $Z_2$ polarizes the emitter of transistor $T_{16}$ by ground connection. A resistor $R_{14}$ is inserted between the collector of the transistor $T_{19}$ and the base of transistor $T_{16}$, the latter being, also, linked to ground by a resistor $R_{15}$. A resistor $R_{16}$ is, furthermore, placed between the collector of the transistor $T_{19}$ and the emitter of transistor $T_{16}$.

The collector of the transistor $T_{17}$ is joined with the base of the transistor $T_7$. Its base is linked with a terminal 2 to which signals are sent controlling the speed of motor M in a direct sense, while its emitter is tied to the base of transistor $T_{20}$ by a resistor $R_{17}$. The emitter of transistor $T_{20}$ is, on the one hand, tied to pole $+U$ and, on the other hand, to the base of transistor $T_{17}$ by means of a resistor $R_{20}$. A diode $D_3$ and a resistor $R_{18}$ are series connected and are mounted in parallel with the resistor $R_{20}$. The collector of transistor $T_{20}$ is joined with the base of transistor $T_8$.

If no signal appears at the terminals 1 or 2, the conduction of the transistors $T_{17}$ and $T_{18}$ is blocked by the resistors $R_{19}$ and $R_{20}$, respectively. Consequently, the transistors $T_5$, $T_1$ and $T_7$, $T_3$ are blocked by the resistors $R_5$, $R_1$, $R_7$, and $R_3$ respectively. The transistors $T_4$, $T_8$, and $T_2$, $T_6$, moreover, are also blocked, their base junction-emitter being polarized in reverse by means of the resistors $R_9$ and $R_{11}$, respectively.

When a signal imparting speed to the motor M arrives at the terminal 2 the transistors $T_1$, $T_5$ - $T_2$, $T_6$, and $T_{18}$, $T_{19}$ are still blocked in the above indicated manner. The signal is a current originating from an appropriate generator, feeding the base of the transistor $T_{17}$. The latter amplifies the current in a ratio limited by the resistors $R_{18}$ and $R_{17}$. The current which crosses the transistor $T_{17}$ provides for the saturation of transistor $T_{20}$ and the unblocking of the power transistors $T_3$ and $T_7$.

After being saturated, the transistor $T_{20}$, furthermore, unblocks the transistors $T_3$ and $T_4$. Consequently, the arrangements $I_3$ and $I_4$ are closed and a current, supplied by the source $+U$, $-U$, circulates through the motor from B to A.

It will be noted that the current crossing the transistor $T_{20}$ is much more important because of the amplification factor of the transistor $T_{17}$ and the resistors $R_{17}$ and $R_{18}$ then the current crossing the transistor $T_{17}$. The result is that when the arrangement $I_3$ and $I_4$ are rendered conducting by the signal arriving at terminal 2, the transistors $T_4$ and $T_8$ are completely saturated, while the transistors $T_3$ and $T_7$ are conductive without being saturated. The control of the current in the motor M then is carried out by control of the conduction of the transistors $T_3$ and $T_7$, by means of the transistor $T_{17}$.

Thus, when a signal appears at the terminal 2 the arrangement $I_4$ is completely closed in the manner of a circuit breaker, irrespective of the amplitude of the signal, while the arrangement $I_3$ is more or less conductive according to the amplitude of this signal. The acceleration of the motor M is controlled by $I_3$.

This demonstrates that the transistors $T_3$ and $T_7$ have to be, as in the known devices, power transistors of high performance and sturdy breakdown voltage, hence expensive, while the transistors $T_4$ and $T_8$ may be power transistors of more modest performance, therefore less expensive.

When one wishes to brake the motor M one omits the control signal at the terminal 2 which again blocks the transistors $T_{17}$, $T_{20}$, $T_7$, $T_3$, $T_8$, and $T_4$ and one sends a braking signal to the terminal 1. This signal is a current originating from an appropriate generator feeding the base of the transistor $T_{18}$. The latter amplifies the current in a ratio limited by the resistors $R_{13}$ and $R_{12}$. The current which crosses the transistor $T_{18}$ provides for the saturation of the transistor $T_{19}$ and the unblocking, but not for the saturation of the transistors $T_5$ and $T_1$.

When the transistor $T_{19}$ is then saturated, it unblocks the arrangement $I_2$ through the transistor $T_{16}$. The presence of the latter, and the difference of the structure of the arrangement $I_2$, from that of the arrangement $I_4$, are due to the fact that in the braking the counter-electromotive force is added to the feed voltage. Therefore, if the arrangement $I_2$ were similar to the arrangement $I_4$, the energy dissipated by the transistors $T_1$ and $T_5$ would be very great, and there would be a risk of their deterioration.

To correct this drawback, and to reduce the energy wasted in the transistors $T_1$ and $T_5$, the transistors $T_2$ and $T_6$ of the arrangement $I_2$ function as a voltage generator. The Zener diode $Z_2$ imparts to the emitter of the transistor $T_{16}$ a potential $+u$. When the braking signal unblocks the transistor $T_{19}$, the latter in turn saturates the transistor $T_{16}$ which activates the voltage generator $I_2$.

To be in a normal state of operation, the potential of the emitter of the transistor $T_6$ must then be higher than the potential $+u$ since the voltage generator $I_2$ can only be operative under this condition. When the arrangements $I_1$ and $I_2$ then, are conductors, and a current runs through the motor M from A to B, the potential of point B is at least equal to $+u$. The result is a reduction of the emitter-collector voltage of the power transistors $T_1$ and $T_5$ by $u$.

In the absence of a braking signal the resistors $R_{10}$ and $R_{15}$ block the transistors $T_6$ and $T_{16}$.

What is claimed is:

1. A feeding device for a motor with D. C. current, comprising, on the one hand, at least two control arrangements for the passage of an electric current installed on either side of said motor to form a link of the circuit connected with the terminals of a D. C. power source, said arrangements each including at least one power transistor and, on the other hand, an actuating device, as such controlled by a control signal, to simultaneously render said arrangements conductive or blocking, said actuating device comprises two transistors of which, the first, receiving the control signal at its base, controls by its emitter-collector path, on the one hand, one of said arrangements apt to be rendered partially conductive by controlling the conduction of its power transistors as a function of said control signal, and on the other hand, the base of the second transistor which is saturated and whose emitter-collector path controls the second arrangement capable of becoming totally conductive by saturating its power transistors, irrespective of the amplitude of the control signal.

2. A device according to claim 1, characterized by each control arrangement for the passage of an electric current including two power transistors of the same polarity, mounted in a Darlington connection the power transistors of the arrangement apt to be rendered partially conductive being sturdy-breakdown voltage transistors.

3. A device according to claim 1, including, in addition to the two aforementioned first control arrangements, two second arrangements for the passage of an electric current, each comprising at least a power transistor forming with the first ones a bridge whose one diagonal is linked to the terminals of the pwer source, and the other to the terminals of said motor, characterized in that it comprises a second actuating device which is controlled by a blocking signal, other than the control signal, and which includes two transistors of which the first receiving the braking signal at its base, controls by its emitter-collector path, on the one hand, the one of the second arrangements apt to become partially conductive and on the other hand, the second transistor which is saturated and whose emitter-collector path controls the one of the second arrangements capable of being rendered totally conductive.

4. A device according to claim 3, characterized in that said one of the second arrangements which was rendered partially conductive consists of a Darlington connection of two power transistors of the same polarity.

5. A device according to claim 3, characterized by including means for imparting a predetermined threshold voltage, at the terminals of said second arrangement which was rendered completely conductive.

6. A device according to claim 5, characterized by said second driving device controlling the second arrangement which is partially conductive by means of a transistor type circuit breaker which, when it closes, imposes a fixed potential on the connection point between this arrangement and said motor.

7. A device according to claim 6, characterized by the fixed potential being obtained by means of at least one Zener diode.

8. A device according to claim 7, characterized in that said transistor type circuit breaker includes a transistor whose base and emitter are controlled by the second driving device, said emitter being stabilized at its potential by said Zener diode, while the emitter-collector path of this transistor controls the second arrangement made totally conductive, which comprises two transistors of opposite polarities such that the emitter and the collector of the one are linked to the collector and to the base of the other, respectively.

9. In a motor drive system including a D. C. motor, a D. C. power source and a pair of power transistor means for selectively connecting said motor across said source, said motor being connected in series between said power transistor means, the improvement which comprises:

control means for selectively actuating one of said power transistor means from cut off condition to saturated condition while the other power transistor means is actuated from cut off condition to partially conductive condition, whereby said one power transistor means may be constituted as a relatively inexpensive component while only said other power transistor means is required to be constituted as a high performance relatively expensive component, said control means including a control signal input, first means connected to said control signal input and to said other power transistor means for causing conduction of said other power transistor means in accord with the amplitude of a control signal, and second means connected to said first means and to said one power transistor means for causing saturation of said one power transistor means in response to but independently of amplitude of said control signal.

10. In a reversible motor drive system, the combination of:

a D. C. motor and a D. C. power source;
a bridge circuit connected to said motor and said source selectively to energize said motor in forward and reverse senses, said bridge circuit having four legs each formed as a power transistor means;

first control means connected to a first pair of legs of said bridge circuit for energizing said motor in the forward sense; and second control means connected to a second pair of legs of said bridge circuit for energizing said motor in the reverse sense;

said first control means having a control signal input and being connected to the power transistors constituting said first pair of legs simultaneously to drive one of them into saturation in response to the presence of but irrespective of amplitude of a control signal input while causing conduction of the other leg in dependence upon said amplitude.

* * * * *